US012536467B2

(12) United States Patent
Ananthanarayanan et al.

(10) Patent No.: US 12,536,467 B2
(45) Date of Patent: Jan. 27, 2026

(54) MERGING MODELS ON AN EDGE SERVER

(71) Applicant: Microsoft Technology Licensing, LLC, Redmond, WA (US)

(72) Inventors: Ganesh Ananthanarayanan, Seattle, WA (US); Anand Padmanabha Iyer, Redmond, WA (US); Yuanchao Shu, Kirkland, WA (US); Nikolaos Karianakis, Sammamish, WA (US); Arthi Hema Padmanabhan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1145 days.

(21) Appl. No.: 17/471,816

(22) Filed: Sep. 10, 2021

(65) Prior Publication Data

US 2022/0383188 A1    Dec. 1, 2022

Related U.S. Application Data

(60) Provisional application No. 63/195,118, filed on May 31, 2021.

(51) Int. Cl.
*G06N 20/00* (2019.01)
*G06F 18/21* (2023.01)
(Continued)

(52) U.S. Cl.
CPC .......... *G06N 20/00* (2019.01); *G06F 18/214* (2023.01); *G06F 18/217* (2023.01); *G06V 20/40* (2022.01)

(58) Field of Classification Search
CPC ...... G06N 20/00; G06V 20/40; G06F 18/217; G06F 18/214
See application file for complete search history.

(56) References Cited

U.S. PATENT DOCUMENTS

2017/0344881 A1* 11/2017 Okuno ................ G06V 10/764
2018/0232663 A1   8/2018 Ross et al.
(Continued)

OTHER PUBLICATIONS

Yu, et al., "Semantic drift compensation for class-incremental learning", In Proceedings of the IEEE/CVF Conference on Computer Vision and Pattern Recognition, Jun. 14, 2020, pp. 6982-6991.
(Continued)

*Primary Examiner* — Ann J Lo

(57) ABSTRACT

Systems and methods are provided for merging models for use in an edge server under the multi-access edge computing environment. In particular, a model merger selects a layer of a model based on a level of memory consumption in the edge server and determines sharable layers based on common properties of the selected layer. The model merger generates a merged model by generating a single instantiation of a layer that corresponds to the sharable layers. A model trainer trains the merged model based on training data for the respective models to attain a level of accuracy of data analytics above a predetermined threshold. The disclosed technology further refreshes the merged model upon observing a level of data drift that exceeds a predetermined threshold. The refreshing of the merged model includes detaching and/or splitting consolidated sharable layers of sub-models in the merged model. By merging models, the disclosed technology reduces memory footprints of models used in the edge server, rectifying memory scarcity issues in the edge server.

20 Claims, 10 Drawing Sheets

(51) Int. Cl.
G06F 18/214 (2023.01)
G06V 20/40 (2022.01)

(56) References Cited

U.S. PATENT DOCUMENTS

| | | | |
|---|---|---|---|
| 2019/0130261 | A1 | 5/2019 | Rallapalli et al. |
| 2019/0260827 | A1* | 8/2019 | Tajima ............... H04L 47/2433 |
| 2021/0110045 | A1 | 4/2021 | Buesser et al. |
| 2022/0024032 | A1* | 1/2022 | Singh .................... B25J 9/1653 |
| 2022/0374635 | A1* | 11/2022 | Xiong ............. G08B 13/19608 |

OTHER PUBLICATIONS

Zhang, et al., "Live Video Analytics at Scale with Approximation and Delay-Tolerance", In Proceedings of the 14th USENIX Symposium on Networked Systems Design and Implementation, Mar. 27, 2017, pp. 377-392.

Zhang, et al., "The Design and Implementation of a Wireless Video Surveillance System", In Proceedings of the 21st Annual International Conference on Mobile Computing and Networking, Sep. 7, 2015, pp. 426-438.

"International Search Report and Written Opinion Issued in PCT Application No. PCT/US22/027742", Mailed Date: Aug. 17, 2022, 11 Pages.

"AWS Outposts", Retrieved from: https://web.archive.org/web/20201208190445/https://aws.amazon.com/outposts/, Dec. 8, 2020, 9 Pages.

"Azure Stack Edge", Retrieved from: https://web.archive.org/web/20200919135652/https://azure.microsoft.com/en-in/products/azure-stack/edge/, Sep. 19, 2020, 17 Pages.

"Jetson Nano", Retrieved from: https://web.archive.org/web/20210215213314/https://www.nvidia.com/en-us/autonomous-machines/embedded-systems/jetson-nano/product-development/, Feb. 15, 2021, 4 Pages.

"Nvidia Multi-Process Service", Retrieved from: https://docs.nvidia.com/deploy/pdfCUDA_Multi_Process_Service_Overview.pdf, Jun. 2020, 28 Pages.

"Nvidia TensorRT", Retrieved from: https://developer.nvidia.com/tensorrt, Retrieved Date: May 12, 2021, 7 Pages.

"PyTorch", Retrieved from: https://web.archive.org/web/20190101155119/https://pytorch.org/, Jan. 1, 2019, 3 Pages.

Ananthanarayan, "Real-Time Video Analytics: The Killer App for Edge Computing", In Journal of Computer, vol. 50, Issue: 10, Oct. 2017, pp. 58-67.

Ananthanarayanan, et al., "Demo: Video Analytics—Killer App for Edge Computing", In Proceedings of the 17th Annual International Conference on Mobile Systems, Applications, and Services, Jun. 12, 2019, pp. 695-696.

Ananthanarayanan, et al., "Traffic Video Analytics—Case Study Report", In Technical report of MSR-TR-1970-3, Dec. 2019, 2 Pages.

Bai, et al., "PipeSwitch: Fast Pipelined Context Switching for Deep Learning Applications", In Proceedings of 14th USENIX Symposium on Operating Systems Design and Implementation, Nov. 4, 2020, pp. 499-514.

Bhardwaj, et al., "Ekya: Continuous Learning of Video Analytics Models on Edge Compute Servers", In Repository of arXiv:2012.10557v1, Dec. 19, 2020, 15 Pages.

Cai, et al., "Learning Complexity-Aware Cascades for Deep Pedestrian Detection", In Proceedings of IEEE International Conference on Computer Vision, Dec. 7, 2015, pp. 3361-3369.

Canel, et al., "Scaling Video Analytics on Constrained Edge Nodes", In Proceedings of the 2nd SysML Conference, Mar. 31, 2019, 12 Pages.

Caruana, Rich, "Multitask learning", In Journal of Machine learning vol. 28, No. 1, Jul. 1, 1997, pp. 41-75.

Du, et al., "Server-Driven Video Streaming for Deep Learning Inference", In Proceedings of the Annual conference of the ACM Special Interest Group on Data Communication on the applications, technologies, architectures, and protocols for computer communication, Aug. 10, 2020, pp. 557-570.

Emmons, et al., "Cracking Open the DNN Black-Box: Video Analytics with DNNs across the Camera-Cloud Boundary", In Proceedings of the Workshop on Hot Topics in Video Analytics and Intelligent Edges, Oct. 21, 2019, pp. 27-32.

Gao, et al., "Estimating GPU Memory Consumption of Deep Learning Models", In Proceedings of the 28th ACM Joint Meeting on European Software Engineering Conference and Symposium on the Foundations of Software Engineering, Nov. 8, 2020, pp. 1342-1352.

Harwell, et al., "Microsoft Rocket Video Analytics Platform", Retrieved from: https://github.com/microsoft/Microsoft-Rocket-Video-Analytics-Platform, Jun. 2, 2021, 8 Pages.

He, et al., "Mask R-CNN", In Journal of The Computing Research Repository, Mar. 20, 2017, 9 Pages.

Hsieh, et al., "Focus: Querying Large Video Datasets with Low Latency and Low Cost", In Proceedings of 13th Symposium on Operating Systems Design and Implementation, Oct. 18, 2018, pp. 269-286.

Huang, et al., "SwapAdvisor: Pushing Deep Learning Beyond the GPU Memory Limit via Smart Swapping", In Proceedings of the Twenty-Fifth International Conference on Architectural Support for Programming Languages and Operating Systems, Mar. 16, 2020, pp. 1341-1355.

Hung, et al., "VideoEdge: Processing Camera Streams using Hierarchical Clusters", In Proceedings of IEEE/ACM Symposium on Edge Computing, Oct. 25, 2018, pp. 115-131.

Jain, et al., "Spatula: Efficient Cross-camera Video Analytics on Large Camera Networks", In Proceedings of ACM/IEEE Symposium on Edge Computing (SEC)., Nov. 12, 2020, 15 Pages.

Jeon, et al., "Multi-tenant GPU Clusters for Deep Learning Workloads: Analysis and Implications", In Microsoft Research Technical Report, May 2018, 14 Pages.

Jeon, et al., "Analysis of Large-Scale Multi-Tenant GPU Clusters for DNN Training Workloads", In Proceedings of the Usenix Conference on Usenix Annual Technical Conference, Jul. 2019, pp. 947-960.

Jiang, et al., "Chameleon: Scalable Adaptation of Video Analytics", In Proceedings of the Conference of the ACM Special Interest Group on Data Communication, Aug. 20, 2018, pp. 253-266.

Jiang, et al., "Mainstream: Dynamic Stem-sharing for Multi-tenant Video Processing", In Proceedings of the USENIX Annual Technical Conference (USENIX ATC '18), Jul. 11, 2018, pp. 29-41.

Jiang, et al., "Networked Cameras Are the New Big Data Clusters", In Proceedings of the Workshop on Hot Topics in Video Analytics and Intelligent Edges, Oct. 21, 2019, pp. 1-17.

Kang, et al., "NoScope: Optimizing Neural Network Queries over Video at Scale", In Proceedings of the VLDB Endowment, Aug. 2017, pp. 1586-1597.

Kewalramani, Avi, "Live Video Analytics with Microsoft Rocket for reducing edge compute costs", Retrieved from: https://techcommunity.microsoft.com/t5/internet-of-things/live-video-analytics-with-microsoft-rocket-for-reducing-edge/ba-p/1522305, Jul. 15, 2020, 7 Pages.

Li, et al., "A convolutional neural network cascade for face detection", In Proceedings of IEEE Conference on Computer Vision and Pattern Recognition, Jun. 7, 2015, pp. 5325-5334.

Li, et al., "Reducto: On-Camera Filtering for Resource-Efficient Real-Time Video Analytics", In Proceedings of the Annual Conference of the ACM Special Interest Group on Data Communication on the Applications, Technologies, Architectures, and Protocols for Computer Communication, Aug. 10, 2020, pp. 359-376.

Lin, et al., "Feature Pyramid Networks for Object Detection", In Proceedings of the IEEE Conference on Computer Vision and Pattern Recognition, Jul. 22, 2017, pp. 2117-2125.

Regazzoni, et al., "Video Analytics for Surveillance: Theory and Practice", In Journal of IEEE Signal Processing Magazine vol. 27, Issue 5, Sep. 2010, pp. 16-17.

Russakovsky, et al., "ImageNet Large Scale Visual Recognition Challenge", In Publication of International Journal of Computer Vision (IJCV), vol. 115, Issue 3, Dec. 2015, 43 Pages.

(56) References Cited

OTHER PUBLICATIONS

Sarwar, et al., "Incremental learning in deep convolutional neural networks using partial network sharing", In Journal of IEEE Access, vol. 8, Dec. 30, 2019, pp. 4615-4628.
Senior, et al., "Video analytics for retail", In Proceedings of IEEE Conference on Advanced Video and Signal Based Surveillance, Sep. 5, 2007, pp. 423-428.
Shriram, et al., "Dynamic memory management for gpu-based training of deep neural networks", In Proceedings of IEEE International Parallel and Distributed Processing Symposium, May 24, 2019, pp. 200-209.
Sun, et al., "Adashare: Learning what to share for efficient deep multi-task learning", In Repository of arXiv:1911.12423v1, Nov. 27, 2019, pp. 1-12.
Vahl, et al., "PyTorch-YOLOv3", Retrieved from: https://github.com/eriklindernoren/PyTorch-YOLOv3, Jul. 11, 2021, 8 Pages.
Vandenhende, et al., "Branched multi-task networks: deciding what layers to share", In Repository of arXiv:1904.02920v5, Aug. 13, 2020, pp. 1-19.
Wang, et al., "Characterizing Deep Learning Training Workloads on Alibaba-PAI", In Repository of arXiv:1910.05930v1, Oct. 14, 2019, 14 Pages.
Wang, et al., "Towards Scalable Edge-Native Applications", In Proceeding of ACM/IEEE Symposium on Edge Computing, Nov. 7, 2019, 14 Pages.
Wu, et al., "Irina: Accelerating DNN Inference with Efficient Online Scheduling", In Proceedings of 4th Asia-Pacific Workshop on Networking, Aug. 3, 2020, pp. 36-43.
Xiao, et al., "Gandiva: Introspective Cluster Scheduling for Deep Learning", In Proceedings of the 13th USENIX Symposium on Operating Systems Design and Implementation, Oct. 8, 2018, pp. 595-610.
Yi, et al., "Lavea: Latency-aware video analytics on edge computing platform", In Proceedings of the Second ACM/IEEE Symposium on Edge Computing, Oct. 12, 2017, 13 Pages.
Yosinski, et al., "How transferable are features in deep neural networks?", In Proceedings of 27th Annual Conference on Neural Information Processing Systems, Nov. 6, 2014, pp. 1-9.
Yousefpour, et al., "All one needs to know about fog computing and related edge computing paradigms: A complete survey", In Journal of Journal of Systems Architecture, vol. 98, Sep. 2019, pp. 289-330.
Yu, et al., "A Survey on the Edge Computing for the Internet of Things", In Journal of IEEE Access, vol. 6, Nov. 29, 2017, pp. 6900-6919.
Yu, et al., "Salus: Fine-Grained GPU Sharing Primitives for Deep Learning Applications", In Proceedings of Machine Learning and Systems, vol. 2, Mar. 2020, 14 Pages.
Office Action Received for European Application No. 22726333.2, mailed on Jan. 9, 2024, 3 pages.
Communication under Rule 71(3) Received in European Patent Application No. 22726333.2, mailed on Jan. 3, 2025, 08 pages.

\* cited by examiner

Layer Properties 402

| Model ID 404 | Layer ID 406 | Input Data Size 408 | Kernel size 410 | Stride 412 (pixels) | Output Data Size 414 |
|---|---|---|---|---|---|
| 001 | 001 | 8192 | 512 | 8 | 4096 |
| *001* | *002* | *4096* | *512* | *8* | *1024* |
| 001 | 003 | 1024 | 512 | 8 | 4096 |
| *001* | *004* | *4096* | *512* | *8* | *1024* |
| 001 | 005 | 1024 | 512 | 8 | 8 |
| 002 | 001 | 16384 | 1024 | 8 | 8192 |
| 002 | 002 | 8192 | 1024 | 8 | 4096 |
| *002* | *003* | *4096* | *512* | *8* | *1024* |
| 002 | 004 | 1024 | 512 | 8 | 64 |
| 002 | 005 | 64 | 512 | 4 | 2 |
| 003 | 001 | 8192 | 512 | 8 | 4096 |
| 003 | 002 | 1024 | 512 | 8 | 64 |
| 003 | 003 | 64 | 512 | 8 | 4096 |
| *003* | *004* | *4096* | *512* | *8* | *1024* |
| 003 | 005 | 1024 | 512 | 4 | 4 |

Sharable layers 420 (Model ID, Layer ID):
(001, 002), (001, 004), (002, 003), and (003, 004)

FIG. 4

MERGING MODELS ON AN EDGE SERVER

CROSS-REFERENCE TO RELATED APPLICATIONS

This application claims priority to and the benefit of U.S. Provisional Patent Application No. 63/195,118, filed on May 31, 2021, the disclosure of which is hereby incorporated herein by reference in its entirety.

BACKGROUND

With advent of 5G, Multi-access Edge Computing (MEC) with video analytics pipelines has become important to improve performance and privacy. While having less computing power than cloud servers, edge servers are able to perform analytic tasks on data streams (e.g., video, audio, images) captured by Internet of Things (IoT) devices. The data analytics include object recognition (e.g., recognizing a person or a thing appearing on a video stream) based on trained models. For example, a service application may use one trained model for identifying a person and another trained model for identifying an automobile in a video stream. However, implementing these models on the edge server involves significant memory requirements. For instance, to run a model requires loading parameters into a graphics processing unit (GPU) memory and reserving enough space for any intermediate data that is generated during inference execution of the model. To address these issues, the models may be swapped on and off of the GPU memory (which causes latency and/or accuracy issues), compressing and quantizing the models (which trades accuracy for a reduced memory footprint), or—as a last resort—uploading the video to the cloud for processing (which comes with significant bandwidth costs and increases latency substantially).

As described further below, an "on-premises" edge server (or "on-prem" edge server) may generally refer to a server in geographic proximity to IoT devices, whereas a "network" edge server may be located farther away from the IoT devices and may service multiple on-premises edge servers within a geographic area. To facilitate geographic proximity, edge servers are often physically constrained—which limits their memory and computing resources. In contrast to edge servers, cloud servers may be located in large-scale datacenters and may service a broad geographic region. In aspects, based on the distributed architecture of a cloud network, cloud servers may have access to significantly more processing and memory resources than the edge servers. This, combined with the fact that video analytics models are continually growing in size and complexity—and becoming more and more memory intensive—can cause latency and/or throughput issues at the edge servers. Not only so, but the number of IoT devices served by edge servers has increased exponentially. As an example, traffic monitoring for even a small city involves analyzing hundreds of live streams from distributed cameras in parallel.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Aspects of the present disclosure relate to merging models (e.g., analytics models) for processing on an edge server. In examples, the system identifies layers that are sharable among a plurality of models and merges the models by instantiating one layer that corresponds to the sharable layers. The disclosed technology determines candidate layers for merging models based on similarity and/or matching of properties (e.g., input size, output size, kernel size, and stride) of each layer of respective models. In determining the candidate layers, the disclosed technology reduces a combinational search space among the models based on characteristics of the models. The edge system uses an intelligent heuristic to reduce an amount of retraining of models required for merging. In aspects, the reduced combinational search space and retraining of models due to the merging improves efficiency of memory use and performance in the edge server.

The disclosed technology relates to edge servers in an on-premises edge of a private cloud network that may interface with a radio access network (RAN). A RAN is a part of a mobile wireless telecommunications system. The RAN, in combination with a core network of a cloud service provider, represents a backbone network for mobile wireless telecommunications. According to 5G specifications, a RAN includes at least a radio unit (RU), a distributed unit (DU), a central unit (CU), and a RAN intelligent controller (RIC). Cell towers transmit and receive radio signals to communicate with mobile devices (e.g., smartphones) over radio (e.g., 5G). RUs at one or more cell towers connect to a DU of the edge server (e.g., a RAN server) at an on-premises edge of the cloud RAN. The term "on-premises edge" may refer to a datacenter at a remote location at the far-edge of a private cloud, which is in proximity to the one or more cell towers. Various service applications may perform different functions, such as network monitoring or video streaming, and may be responsible for evaluating data associated with the data traffic. For instance, a service application may perform data analytics, such as object recognition (e.g., object counting, facial recognition, human recognition) on a video stream.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 4 illustrates an example of a data structure associated with merging models in accordance with aspects of the present disclosure.

Figure 6A:
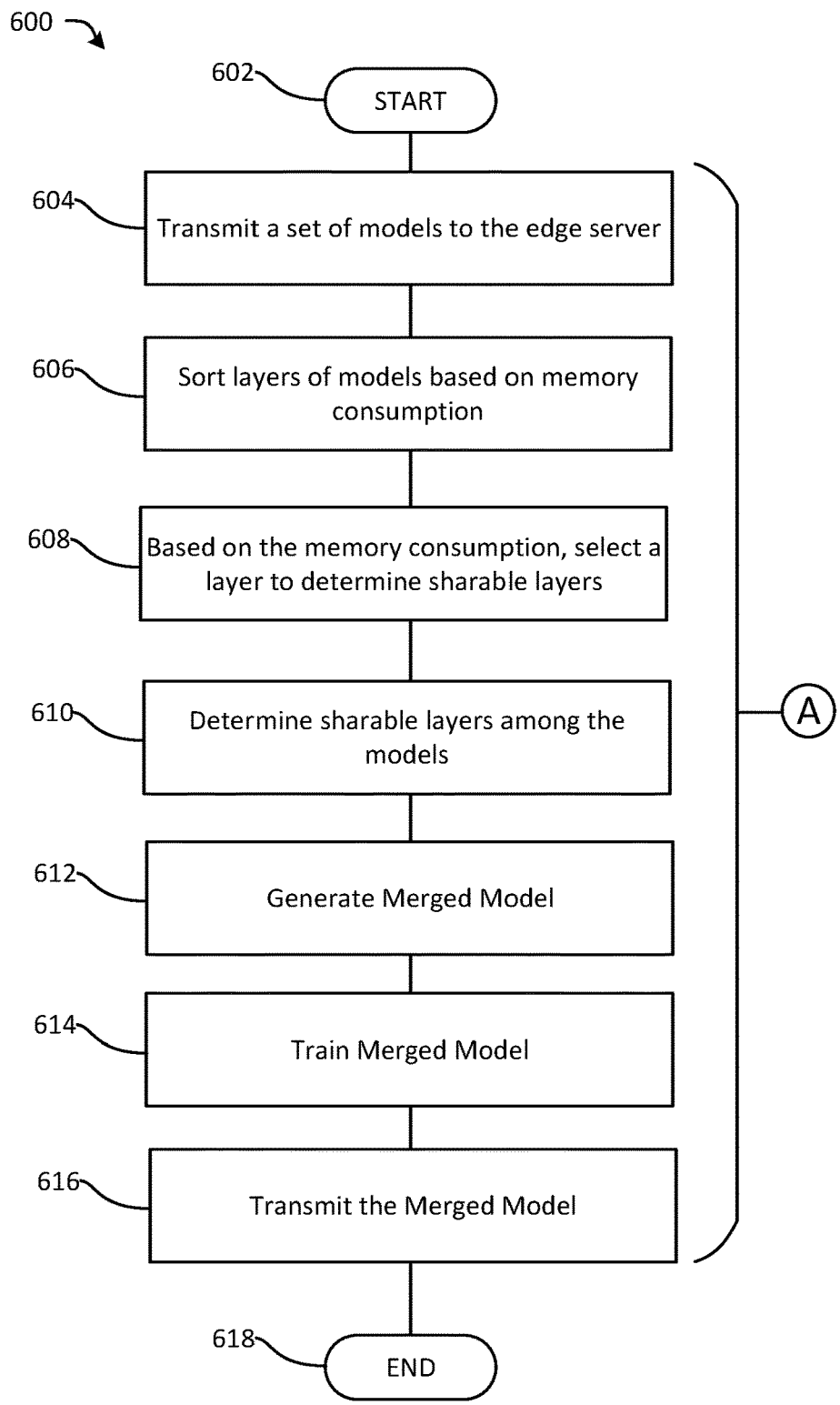
Figure 6B:
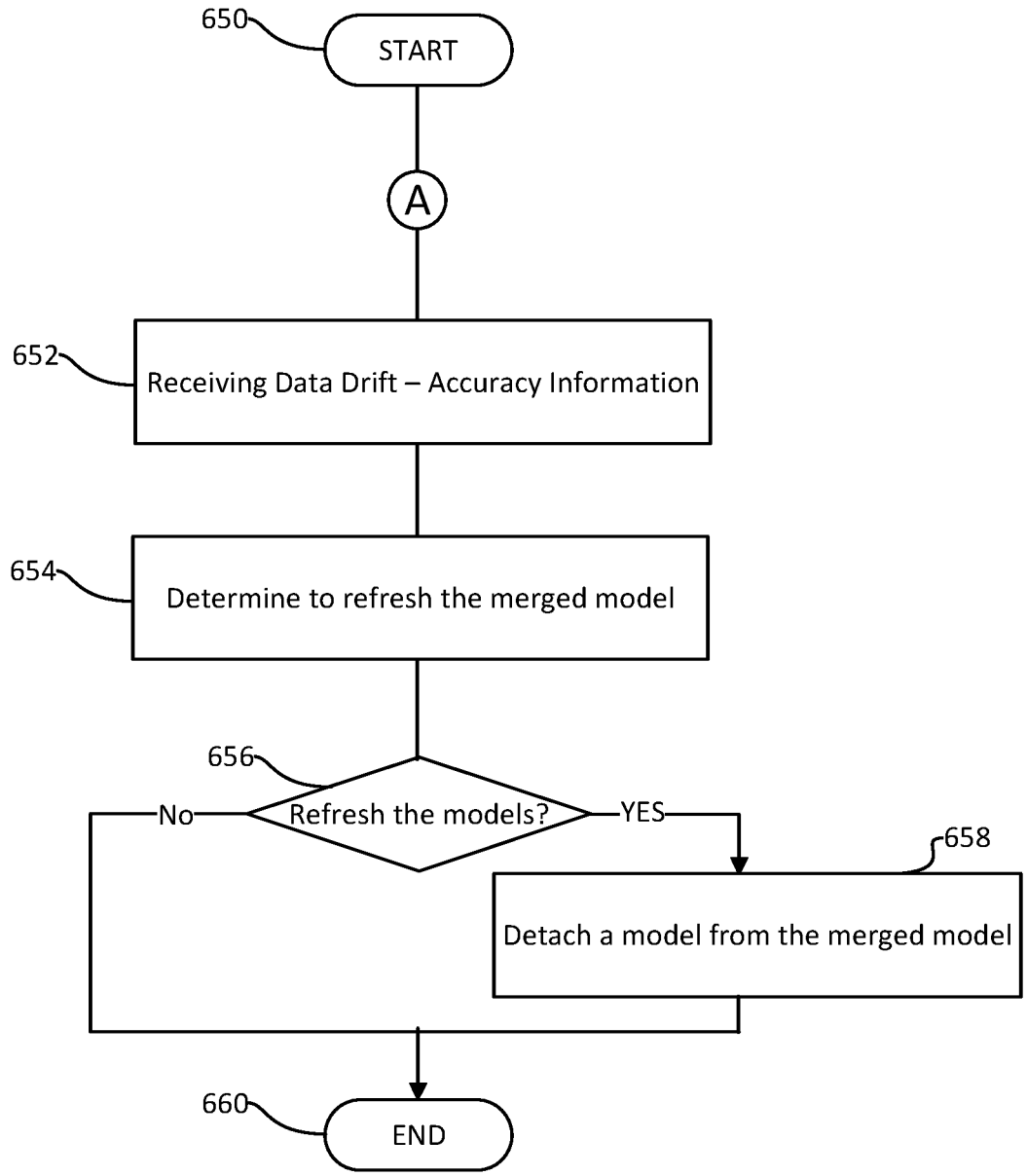

FIGS. 6A-B illustrate examples of methods for merging models in accordance with aspects of the present disclosure.

Figure 7:
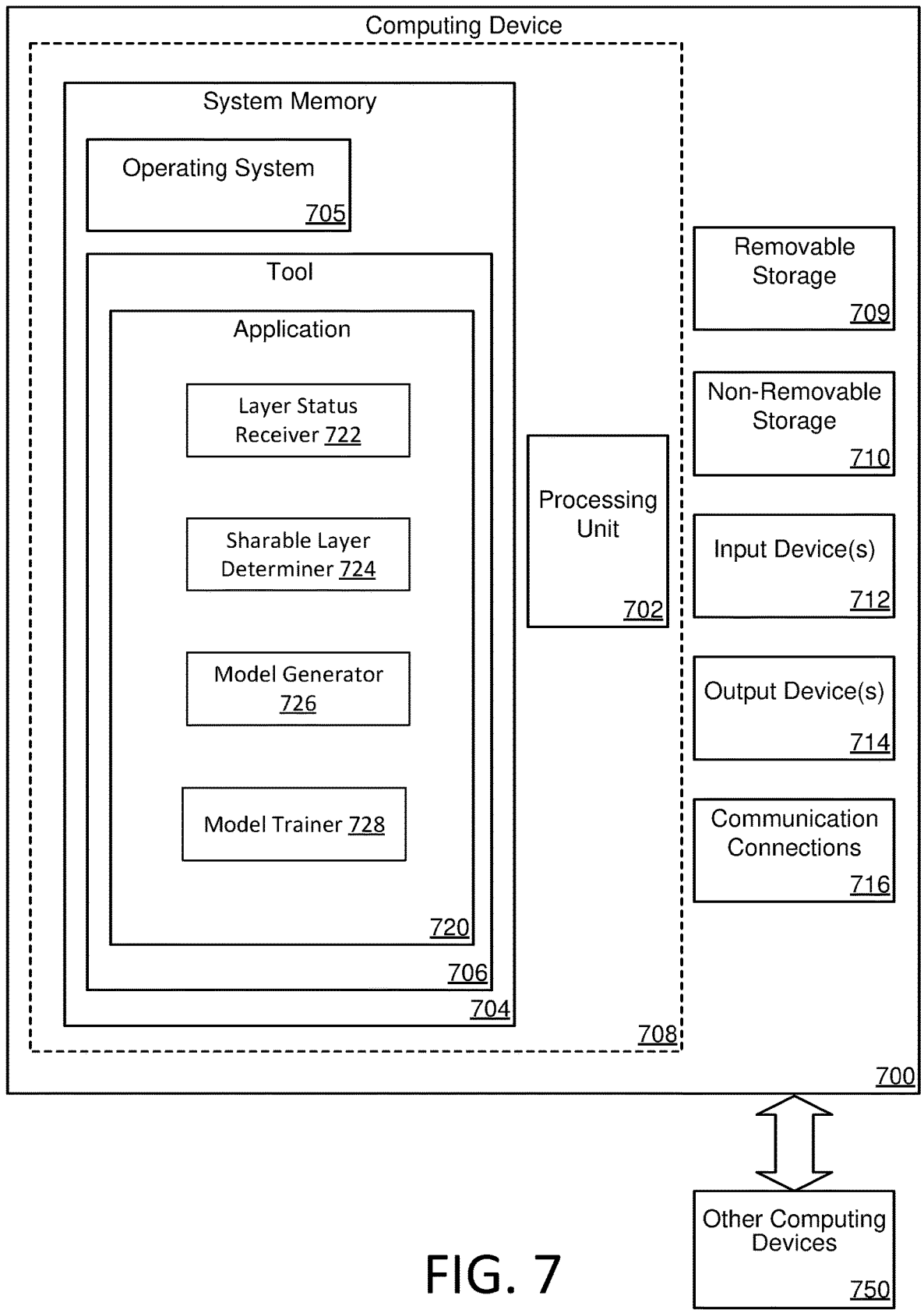

FIG. 7 is a block diagram illustrating example physical components of a computing device with which aspects of the disclosure may be practiced.

Figure 8A:
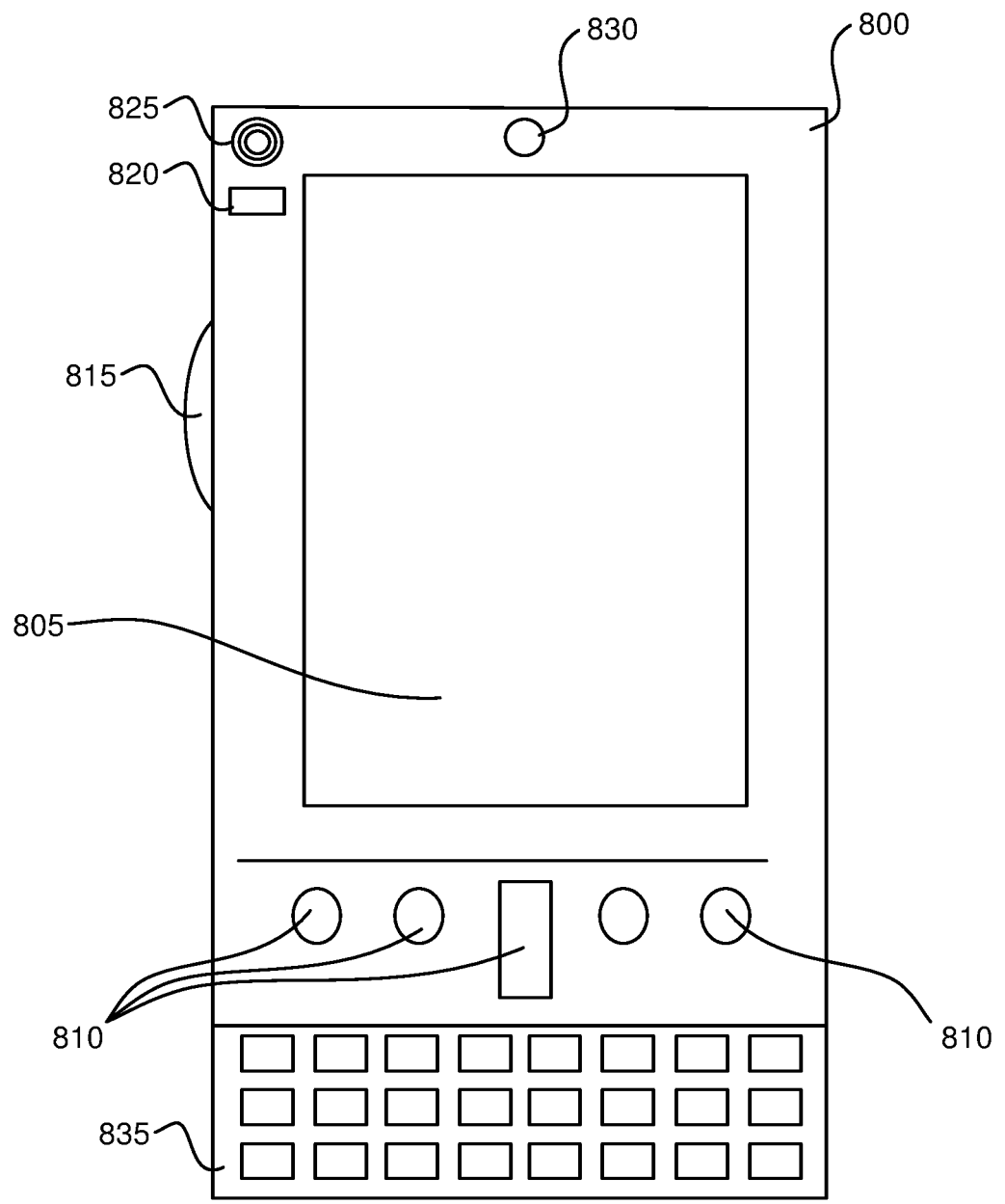

FIG. 8A is a simplified diagram of a mobile computing device with which aspects of the present disclosure may be practiced.

Figure 8B:
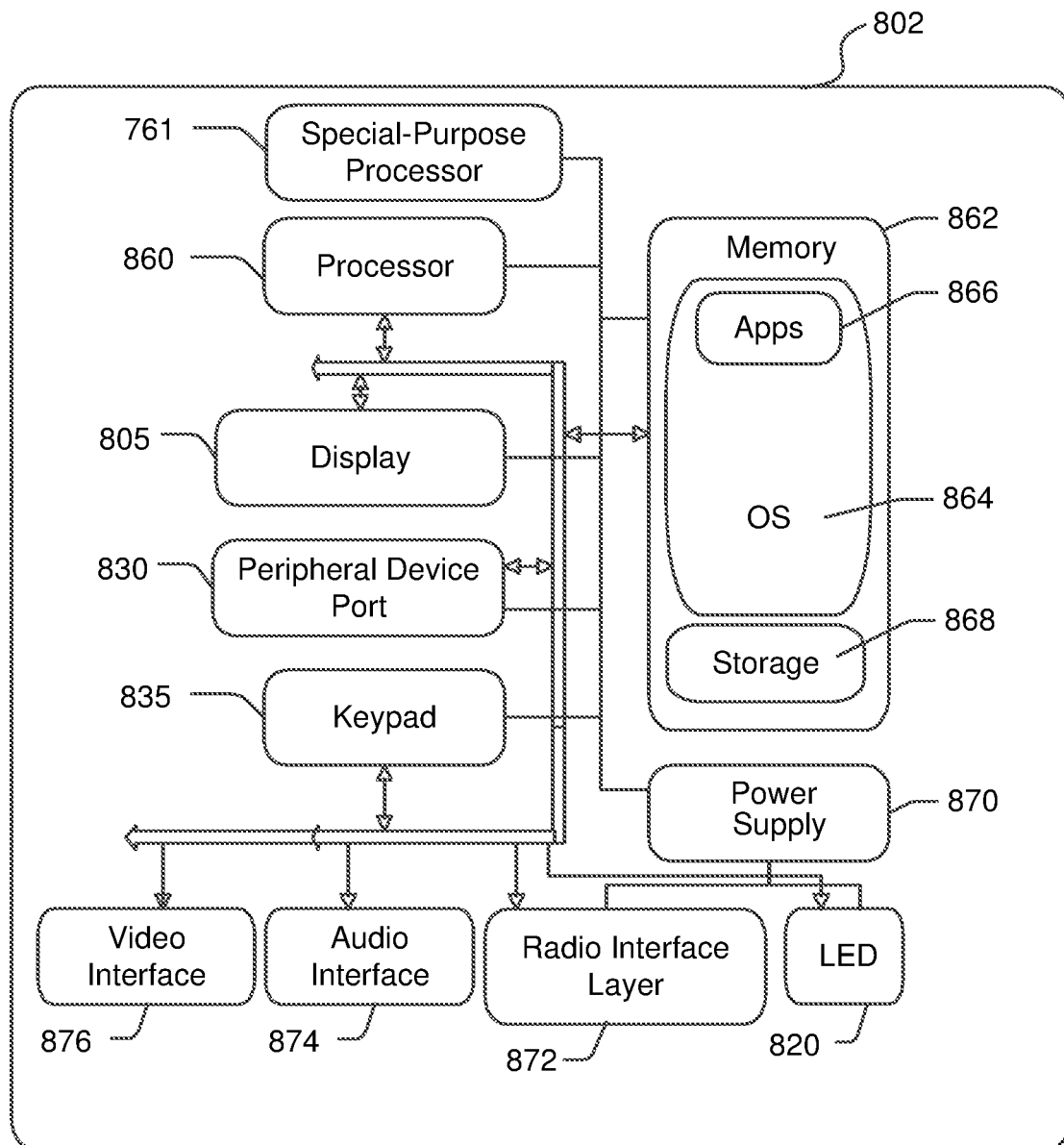

FIG. 8B is another simplified block diagram of a mobile computing device with which aspects of the present disclosure may be practiced.

DETAILED DESCRIPTION

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

Wireless telecommunication networks may be implemented by cloud services. In this case, the cloud service connects to cell towers, with which IoT devices connect, to the public network (e.g., the Internet) and/or private networks. The cloud service provides virtual servers and other computing resources for dynamically scaling the computing capacity as needed based on the volume of data traffic. To enable real-time processing of data traffic, the on-premises edge server is relatively close (e.g., a few kilometers) to the cell tower. As discussed in more detail below, the present disclosure relates to merging models used for processing data, such as video analytics, at an edge server. In particular, the edge server executes one or more service applications on the central processing unit (CPU) and/or heterogeneous accelerators (e.g., a graphics processing unit, GPU). The service applications use models to analyze stream data (e.g., video stream data from IoT devices) and create abstract data for further analyses in the cloud. The abstract data may include identities of object types and/or object counts recognized and/or predicted based on analytics performed on stream data.

The disclosed technology addresses the issue of scarce memory resources at edge servers by merging models used by one or more service applications. In particular, one or more layers with common properties are identified as sharable layers across multiple models at the edge server. In aspects, the one or more sharable layers may be identified in a descending order of memory consumption on the edge server. The common properties may include input and output data sizes, a kernel size, and strides of respective layers. The sharable layers may be reduced to a single common layer for retraining the layer for the respective models. The model merger instructs the edge server to replace the identified sharable layers in the respective models with the common layer, thereby merging the common portions of a plurality of models. By using the merged model with one or more common layers, the edge server reduces memory consumption when using or training the respective models.

Figure 1:
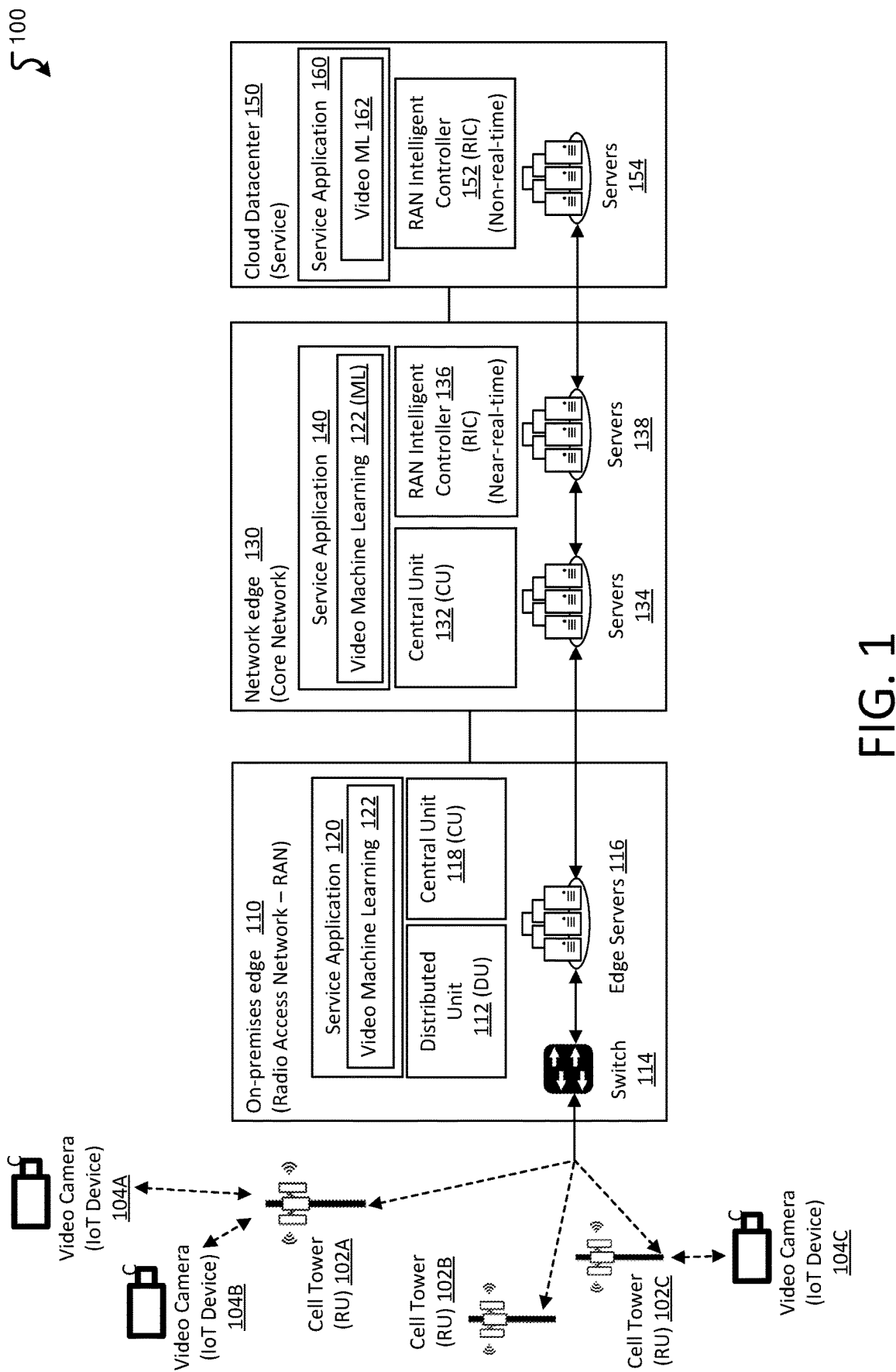
FIG. 1 illustrates an overview of an example system for merging models at an edge server in accordance with aspects of the present disclosure.

FIG. 1 illustrates an overview of an example system 100 for merging models at an edge server of a cloud service in accordance with the aspects of the present disclosure. Cell towers 102A-C transmit and receive wireless communications with IoT devices (e.g., video cameras, health monitors, watches, appliances, etc.) over a telecommunications network. Video cameras 104A-C represent examples of IoT devices communicating with the cell towers 102A-C in the field. In aspects, the video cameras 104A-C are capable of capturing video images and transmit the captured video images over a wireless network (e.g., the 5G cellular wireless network) to one or more of the cell towers 102A-C. For example, respective video cameras 104A-C may capture scenes for video surveillance, such as traffic surveillance or security surveillance. The example system 100 further includes an on-premises edge 110 (including switches and edge servers), a network edge 130 (including core network servers), and a cloud datacenter 150 (including cloud servers responsible for providing cloud services). In aspects, the example system 100 corresponds to a cloud RAN infrastructure for a mobile wireless telecommunication network.

As illustrated, the on-premises edge 110 is a datacenter that is part of a cloud RAN, which includes distributed unit (DU) 112, central unit (CU) 118, and service application 120. In aspects, the on-premises edge 110 enables cloud integration with a radio access network (RAN). The on-premises edge 110 includes a switch 114 and edge servers 116. The switch 114 and the edge servers 116 process incoming data traffic and outgoing data traffic. The edge servers 116 execute service applications 120. In aspects, the on-premises edge 110 is generally geographically remote from the cloud datacenters associated with the core network and cloud services. The remote site is in geographic proximity to the cell towers. For example, the proximity in the present disclosure may be within about a few kilometers. In aspects, the upstream data traffic corresponds to data flowing from the cell towers 102A-C to servers 154 in the cloud datacenter 150 (service) Similarly, the downstream data traffic corresponds to data flowing from the cloud datacenter 150 (service) to the cell towers. In further aspects, as datacenters become closer to the cloud datacenter 150, server resources (including processing units and memory) become more robust and powerful. As an example, servers 154 may be more powerful than servers 134 and 138, which may be more powerful than edge servers 116. Conversely, the closer a datacenter is to connected devices (e.g., IoT devices), the more trusted the datacenter may be. In this case, edge servers 116 are more trusted than servers 134 and 138, which are more trusted than servers 154.

In aspects, the network edge 130 (e.g., hosting the core network) includes a central unit 132 (CU) and a RAN intelligent controller 136 (RIC) ("near" real-time processing, which may be less strictly time-sensitive than real-time processing). As illustrated, CU 132 is associated with servers 134 and RIC 136 is associated with servers 138. In aspects, the network edge 130 is at a regional datacenter of a private cloud service. For example, the regional datacenter may be about tens of kilometers from the cell towers 102A-C. The network edge 130 includes service application 140 for performing data analytics. For example, the service application 140 includes video machine learning 122, which performs and manages video analytics using machine learning technologies, such as neural networks, to train analytics models. Video machine learning 122 in the network edge 130 may, for example, perform merging and training/retraining of models using memory resources of the network edge 130, which may be more expansive than the memory resources in the edge servers 116 of the on-premises edge 110.

The cloud datacenter 150 (service) includes RIC 152 (non-real-time processing) associated with servers 154. For example, RIC 152 processes non-real-time service operations. In aspects, the cloud datacenter 150 may be at a central location in a cloud RAN infrastructure. In this case, the central locations may be hundreds of kilometers from the cell towers 102A-C. In aspects, the cloud datacenter 150 includes service application 160 for performing data analytics. The service application 160 may perform similar processing tasks as service applications 140 in the network edge 130, but may have access to more processing and memory resources at the cloud datacenter 150.

In aspects, the on-premises edge 110, which is closer to the cell towers 102A-C and to the video cameras 104A-C (or IoT devices) than the cloud datacenter 150, may provide real-time processing. In contrast, the cloud datacenter 150, which is the furthest from the cell towers 102A-C and video cameras 104A-C in the cloud RAN infrastructure, may provide processing in a non-real-time manner (e.g., such as training models).

In aspects, the accelerators in the edge servers 116 are heterogeneous. Some accelerators include pre-programmed logic for performing specific operational partitions. Some other accelerators are programmable. Some accelerators provide fast table lookups, while some other accelerators (e.g., a GPU) provide fast bit operations (e.g., processing graphics and video data).

The service application 120 includes program instructions for processing data according to predetermined data analytics scenarios on edge servers 116. The predetermined analytics may include, for example, video machine learning 122 (Video ML). Video machine learning 122 performs video analytics by extracting and identifying objects from video stream data based on trained object scenarios. For example, video machine learning 122 may rely on a plurality of trained models to identify different types of objects (e.g., trees, animals, people, automobiles, etc.), a count of objects (e.g., a number of people in a video frame), and/or a particular object (e.g., a particular person based on facial recognition). In aspects, each model may be trained to identify a different type of object. The incoming video stream may include background data and object data, which the video cameras 104A-C captured and transmitted to the cell towers 102A-C. For example, the service application 120 may analyze the video stream and extract portions of the video stream as regions of interest, which regions of interest may comprise object data as opposed to background data. Once extracted, the regions of interest may be evaluated to recognize objects (e.g., a face of a person), as described above, or the service application may transmit the extracted regions of interest instead of the full video stream to the cloud for further processing (e.g., to verify recognition of the face of the person).

As described above, the service application 120 may use one or more models for recognizing and/or predicting objects during data analytics of video stream data. Respective models may be fine-tuned for performing distinct functions. For example, a model may accurately recognize faces of people and determine regions within video frames that correspond to the recognized faces. Another model may be fined tuned for recognizing automobiles (including particular automobile makes or models) that appear in the video frames. Some other model may be fine-tuned for recognizing and extracting voices of distinct people from audio data.

The models may include a plurality of layers of processing the video stream data sequentially or in parallel. For example, a model with a plurality of layers may constitute a neural network for predicting and recognizing objects in video stream data. The models may include a recurrent neural network and/or a convoluted neural network with multiple layers.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
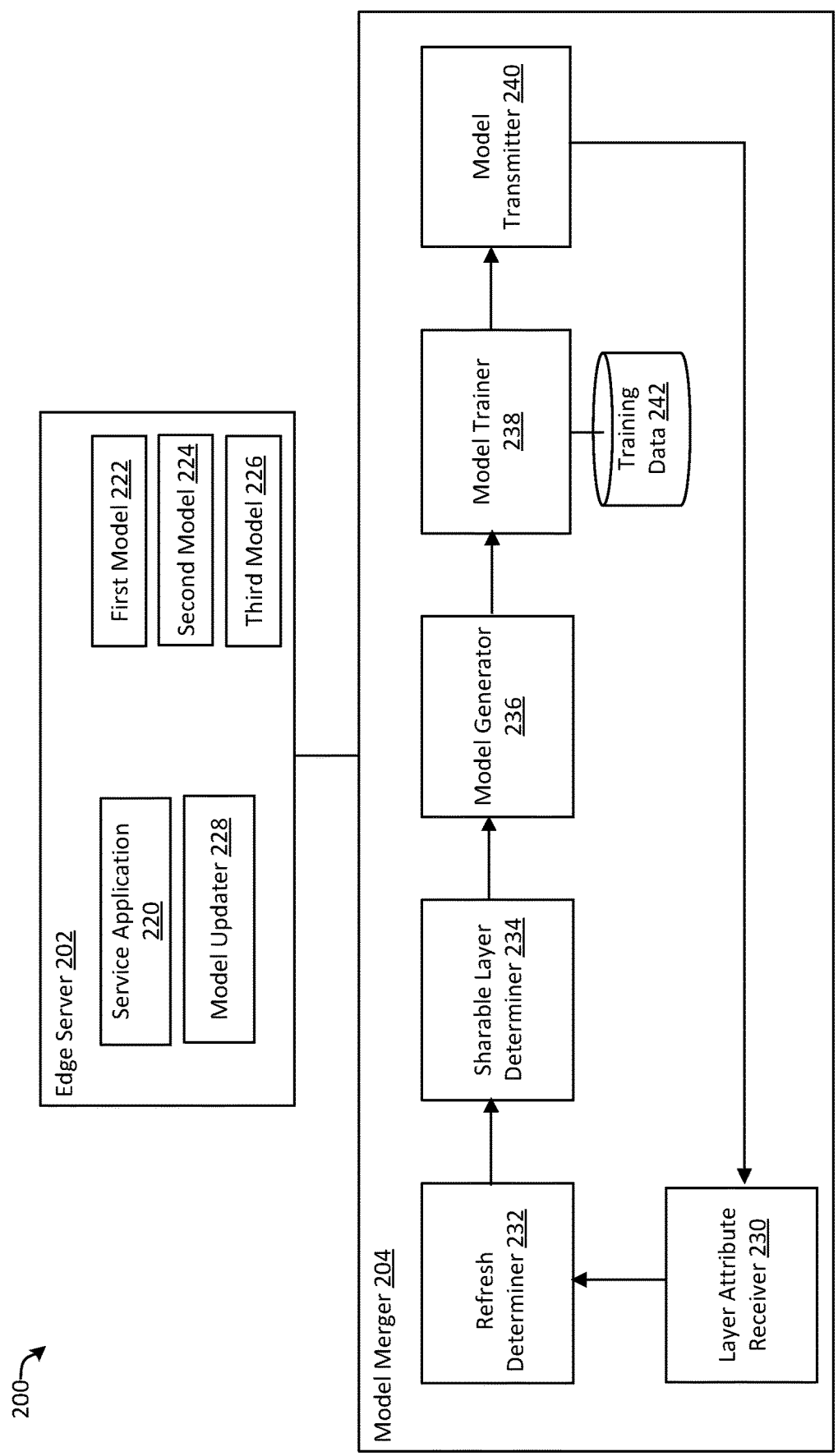
FIG. 2 illustrates an example system for merging models in an edge server in accordance with aspects of the present disclosure.

FIG. 2 illustrates an example system for merging models in accordance with aspects of the present disclosure. The system 200 includes an edge server 202 and a model merger 204. In aspects, the edge server 202 is an on-premises server (e.g., one of the edge servers 116 of FIG. 1). In some other aspects, the model merger 204 may be, but is not limited to, execution on servers 134 in the network edge 130 and/or in servers 154 in the cloud datacenter 150.

The edge server 202 includes a service application 220, a model updater 228, and a plurality of models (e.g., a first model 222, a second model 224, and a third model 226, etc.). In aspects, the service application 220 performs data analytics. Examples of the data analytics may include analyzing video stream data from IoT devices (e.g., the video cameras 104A-C as shown in FIG. 1), recognizing objects (e.g., people, faces, automobiles) from the video stream data, and extracting regions of interest associated with the recognized objects in the video. Some other examples of the data analytics include analyzing sound data and recognizing voices of predetermined people. The service application 220 may use one or more models for the data analytics. Respective models may be specialized for accurately performing predetermined tasks. For example, the first model 222 may be specialized for recognizing people (and/or a count of people) in the video stream data and the second model 224 may be specialized for facial recognition of particular people from the video stream data. The first model 222 and the second model 224 may further extract regions of the video stream data corresponding to the recognized people or faces, respectively. In aspects, a model includes multiple layers of processing. The model updater 228 updates one or more models (e.g., the first model 222, the second model 224, and the third model 226) upon merging and/or splitting models.

The model merger 204 merges models for reducing the memory footprint of models in the edge server 202. The model merger 204 includes a layer attribute receiver 230, a refresh determiner 232, a sharable layer determiner 234, a model generator 236, a model trainer 238, a model transmitter 240, and training data 242. The layer attribute receiver 230 receives attributes associated with a plurality of layers of respective models from the edge server 202. In aspects, the attributes of respective layers include an amount of memory consumed, input data size, output data size, kernel size, and a stride. For example, the stride represents a number of pixels to shift in each iteration of analyzing video and/or image data. Additionally or alternatively, the attributes include data drift, which represents a degree of deviation of output data from expected data. Data drift may impact an ability of the respective models and to recognize, predict, and extract data based on the data analytics. In aspects, a data drift that is greater than a predetermined threshold for a model indicates that the model needs to be improved by fine-tuning of parameters. Additionally or alternatively, when the model is a merged model, a portion of the merged model, which corresponds to the excessive data drift, may need to be detached (e.g. split).

In aspects, the model merger 204 merges select layers of different models. Some systems may consolidate layers in early sections of multi-layer models to reduce computation when executing inferences on a common set of input data (e.g., input video stream). These systems generate common stems of layers to reduce paths of processing data. In contrast, the model merger 204 merges select layers from any location within respective models to reduce the memory footprint of the models.

The refresh determiner 232 determines whether to refresh (or merge models) when a value of data drift is greater than a predetermined threshold.

The sharable layer determiner 234 determines a set of layers that are sharable among the models. In aspects, layers are sharable when a set of properties associated with the respective layers are within a predetermined threshold of similarity, including a case where values of each property of the set of properties among the respective layers match. For example, two layers are sharable when both layers have the same input data size, the same output data size, the same kernel size, and the same size of strides. In aspects, layers that are sharable between distinct models. In some other aspects, a single model may include layers that sharable. The sharable layer determiner 234 may analyze properties of layers for determining sharable layers in a descending order starting from the layer with the highest memory consumption. For example, the sharable layer determiner 234 generates a descending list of layers based on memory consumption for respective models. By consolidating sharable layers that are high in memory consumption, the disclosed technology may efficiently reduce a memory footprint of the overall models (e.g., by merging the heaviest layers first). In aspects, the sharable layer determiner 234 determines a set of sharable layers based on a combinational search on at least a part of layers in the sorted list of layers.

The model generator 236 generates a merged model from the models with the sharable layers by instantiating a single layer that corresponds to the sharable layers. In aspects, the generated model may include multiple entry points as input to the model and multiple exit points as output to the model, each pair of the entry points and the exit points representing a pair of input and output for previously distinct models (i.e., sub-models of the merged model). In aspects, the sub-models of the generated merged model may share one or more instantiations of intermediate layers.

The model trainer 238 trains the generated merged model. In aspects, the model trainer 238 uses training data 242, which is a combination of training data for the previously distinct models. In aspects, merging of the models balances trade-offs between reduced accuracy in predicting inferences and a reduction in memory consumption. The training data 242 may include a predetermined threshold of accuracy that is sufficient or acceptable across all the models that are being merged. When a generated model exhibits a degree of accuracy that surpasses the predetermined threshold, the model may be suitable for performing data analytics. In some aspects, models reserve memory-intensive layers for learning specialized tasks. Accordingly, use of the aggregate training data across the merged models attains a sufficient level of accuracy for inference execution across the merged models. In aspects, the model trainer 238 may also update weights associated with consolidated layers in the generated model. In some examples, the model trainer 238 generates the trained model by executing the respective models or an exemplar model with high-fidelity on sampled frames from a target video feed.

The model transmitter 240 transmits at least the instantiated sharable layer to the edge server 202 for updating the models that are affected by the instantiated sharable layer in the edge server 202. After transmitting the model with at least the instantiated sharable layer, the layer attribute receiver 230 continues receiving the status information associated with layers of the models.

In some aspects, including during a bootstrapping phase, the model transmitter 240 transmits unmerged models to the edge server 202. The edge server 202 performs inference execution using the models based on GPU time-sharing mechanisms. In some other aspects, the model transmitter 240 transmits the merged structure of the generated model and the updated weights to the edge server 202. The edge server 202 replaces individual models in GPU memory with the merged model during swapping operations. As the swapping operations continue over time, the merged models may completely replace the individual models. When a size of the memory of the edge server 202 is insufficient to create a single merged model that includes all layers of the individual models, the edge server 202 may time-slice the merged models on the GPU based on some scheduling mechanisms for executing instructions. In aspects the combined use of the merged models and time-slicing reduce the need for swapping models.

In aspects, the edge server 202 transmits one or more sample frames to the model merger 204 for determining when the merged models need to be refreshed. Data drift, or deviations in semantic accuracy of inference execution, may occur over time as the edge server 202 continues to operate on live video feeds. When the refresh determiner 232 determines the merged models need to be refreshed, the refresh determiner 232 uses the merged structure and weights associated with the merged structure as the initial condition to refine the layered structure of the merged models.

As will be appreciated, the various methods, devices, applications, features, etc., described with respect to FIG. 2 are not intended to limit the system 200 to being performed by the particular applications and features described. Accordingly, additional controller configurations may be used to practice the methods and systems herein and/or features and applications described may be excluded without departing from the methods and systems disclosed herein.

Figure 3:
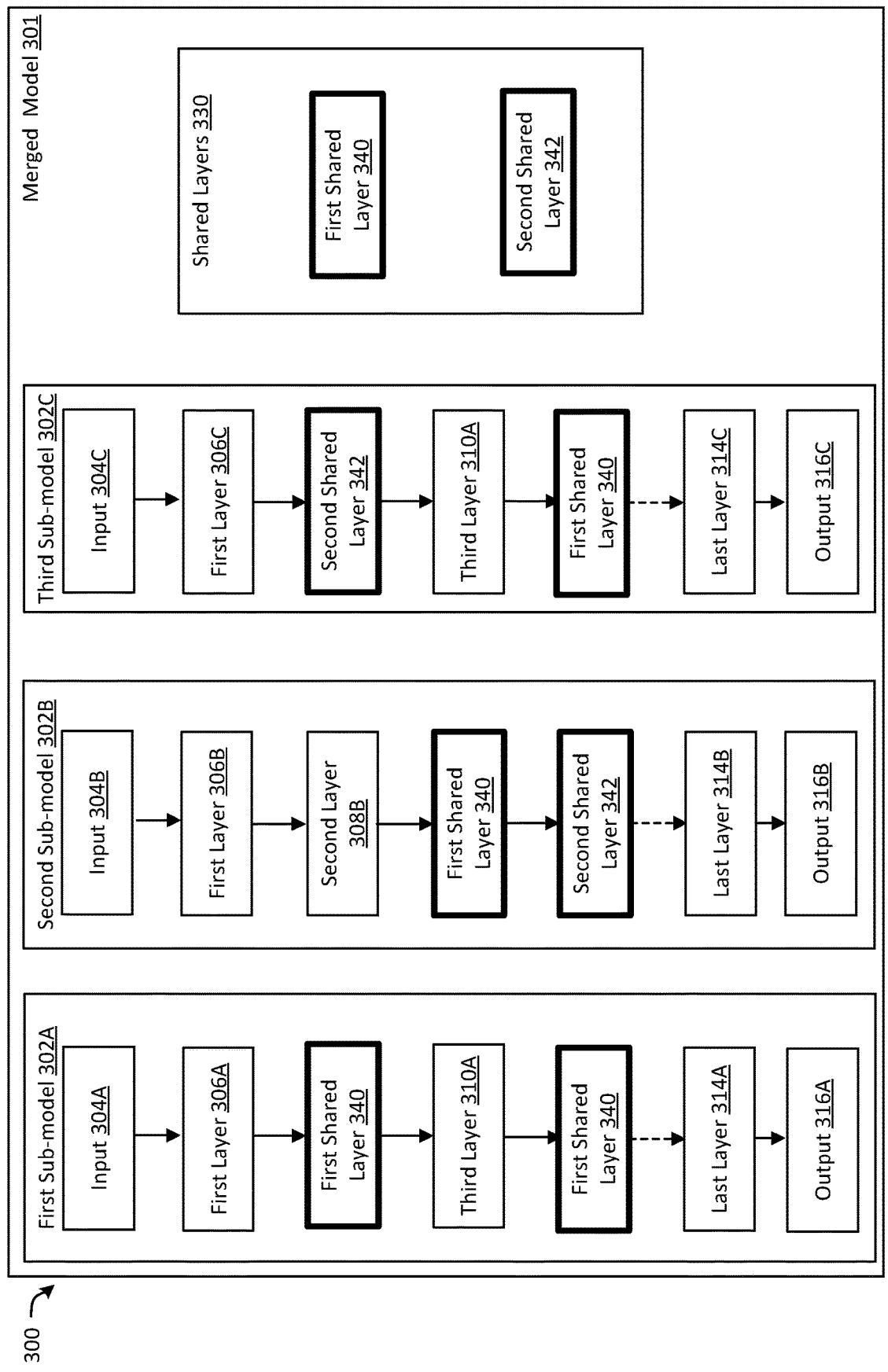
FIG. 3 illustrates an example of data structures for models in accordance with aspects of the present disclosure.

FIG. 3 illustrates an example of data structure for models in accordance with aspects of the present disclosure. The data structure 300 includes a merged model 301. In aspects, the merged model 301 represents a model that the model generator 236 in the model merger 204 has generated based on multiple models with sharable layers.

In the example, the merged model 301 includes three sub-models that were respectively distinct models prior to the merger: a first sub-model 302A, a second sub-model 302B, and a third sub-model 302C. The first sub-model 302A includes an input as an entry point to the model, a first layer 306A, a first shared layer 340, a third layer 310A, a first shared layer 340 (repeating), a last layer 314A, and output 316A as an exit point of the model. In aspects, prior to the merger, the model (now the first sub-model 302A) included two layers with common properties as repeating layers and thus were sharable. The first shared layer 340 in both positions in the first sub-model 302A uses a single instance of the first shared layer 340 in the memory as indicated in the shared layers 330.

The second sub-model 302B includes input 304B, a first layer 306B, a second layer 308B, the first shared layer 340, the second shared layer 342, a last layer 314B, and output 316B. The third sub-model 302C includes input 304C, a first layer 306C, the second shared layer 342, a third layer 310A, the first shared layer 340, a last layer 314C, and output 316C. The first shared layer 340 in respective positions in respective sub-models use a single instance of the first shared layer 340 in the shared layers 330. Similarly, the second shared layer 342 in the second sub-model 302B and the third sub-model 302C use a single instance of the second shared layer 342 in the shared layers 330. As illustrated in the example, the disclosed technology merges models by sharing layers with common properties regardless of positions of the sharable layers in respective sub-models. Accordingly, in this example, use of the first shared layer 340 upon the merging models may reduce memory consumption from four instantiations to one instantiation. Similarly, use of the second shared layer 342 upon merging of the models may reduce memory consumption from two instantiations to one.

FIG. 4 illustrates an example of data structure for properties of layers in models in accordance with aspects of the present disclosure. The data structure 400 includes layer properties 402 for respective layers of models (e.g., a set of the distinct three models prior to the merger to generate the merged model 301 as shown in FIG. 3). In aspects, the layer properties 402 includes model ID 404, layer ID 406, input data size 408, kernel size 410, stride 412 (in pixels), and output data size 414. For example, a model with model ID 001 includes four layers (layer IDs 001, 002, 003, 004, and 005). In particular, some of layers have property values that are in common.

As shown as emphases in FIG. 4, the four layers have common property values (i.e., the input data size of 4096, the kernel size of 512, the stride of 8, and the output data size of 1024. The four layers correspond to the second layer and the fourth layer of the first model, the third layer of the second model, and the fourth layer of the third model (e.g., as an example after the merger, refer to the first shared layer 340 of the first sub-model 302A, of the second sub-model 302B, and of the third sub-model 302C in the merged model 301 as shown FIG. 3.) Accordingly, sharable layers 420 includes the four layers as sharable layers, for which the model generator consolidates into one instantiation of a layer (e.g., the first shared layer 340 in the shared layers 330 as shown in FIG. 3).

Figure 5:
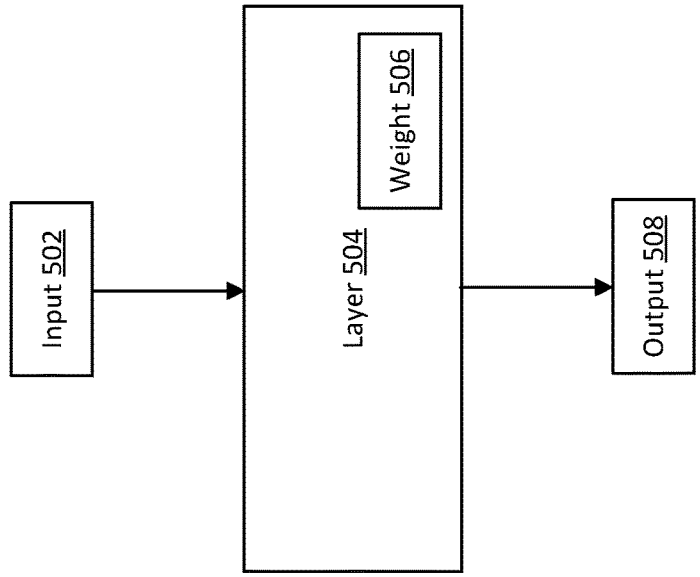
FIG. 5 illustrates an example of a layer of a model in accordance with aspects of the present disclosure.

FIG. 5 illustrates an example data structure of a layer of a model in accordance with aspects of the present disclosure. The data structure 500 includes a layer 504 with input 502 and output 508. The layer includes a weight 506. In aspects, a layer functionality includes extracting features (e.g., people, faces, automobiles, etc.) of data and identifying a predetermined shape that represents objects. In some aspects, the layer 504 is a convolutional layer that filters image based on a predetermined filtering condition and outputs filtered data. In some other aspects, the layer 504 may be a part of a recursive neural network. The layer 504 may be a part of a convolutional neural network. In aspects, the weight 506 determines how various aspects of input data of the layer influence output data of the layer.

FIG. 6A is an example of a method for merging models in accordance with aspects of the present disclosure. A general order of the operations for the method 600A is shown in FIG. 6A. Generally, the method 600A begins with start operation 602 and ends with end operation 618. The method 600 may include more or fewer steps or may arrange the order of the steps differently than those shown in FIG. 6A. The method 600A can be executed as a set of computer-executable instructions executed by a computer system and encoded or stored on a computer readable medium. Further, the method 600A can be performed by gates or circuits associated with a processor, an ASIC, an FPGA, a SOC or other hardware device. Hereinafter, the method 600A shall be explained with reference to the systems, components, devices, modules, software, data structures, data characteristic representations, signaling diagrams, methods, etc., described in conjunction with FIGS. 1, 2, 3, 4, 5, 6B, 7, and 8A-B.

Following start operation 602, the method 600A begins with transmit operation 604, in which a set of models are transmitted to the edge server. In aspects, one or more service applications use the set of models in the edge server. The edge server includes processors and heterogeneous accelerators to execute the service applications. The processors include a CPU and the heterogeneous accelerators include GPU and NIC and other accelerators based on ASIC, FPGA, and NPU, as examples.

Sort operation 606 sorts layers of the models into a list based on memory consumption. In aspects, memory consumption by respective layers of the models may vary. By prioritizing consolidating layers with higher levels of memory consumption, the disclosed technology may reduce the memory footprint of the models more substantially than consolidating layers with lower levels of memory consumptions. In aspects, memory consumption of layers in a model exhibit a power-law distribution, where few layers contribute most of the model's memory usage while the larger number of remaining layers incur little overhead.

Based on memory consumption, select operation 608 selects a layer of a model to determine sharable layers. In aspects, the select operation 608 selects the layer with the highest level of memory consumption. The select operation 608 may select models used for the same or similar data analytics of data. For example, models used for processing video stream data from video cameras capturing scenes from the same or similar locations (e.g., video footage of a location from varying angles of views) or similar types of locations (e.g., scenes of hallways inside buildings, scenes of busy streets with automobile traffic). In aspects, data models used for analyzing similar scenes for the same or similar purposes may have sets of layers with similar properties.

Determine operation 610 determines sharable layers of the models. In aspects, the determine operation 610 determines layers as sharable based on values of properties of the layers. The properties of the layers may include input size, output size, kernel size, and stride size (e.g., the layer properties 402 as shown in FIG. 4). In aspects, the determine operation 610 determines layers of the models as sharable when values of respective properties among the layers match. Additionally or alternatively, the determine operation 610 determines sharable layers when the values of respective properties among the layers are within a predetermined threshold of similarity.

Generate operation 612 generates a model by merging the models. The merger of the model includes consolidating instances of sharable layers (e.g., the first shared layer 340 as shown in FIG. 3). In aspects, the generate operation 612 consolidates distinct instances of repeating layers of a model into one instantiation. In some other aspects, the generate operation 612 consolidates distinct instances of sharable layers across models into one instantiation.

Train operation 614 trains the merged model including the consolidated instantiation of sharable layers. In aspects, the train operation 614 trains the merged model for multiple epochs and/or until the trained layer attains a level accuracy that is higher than a predetermined threshold.

In aspects, the method 600A simultaneously merges and trains layers across models in an incremental fashion. The method 600A selects the first layer from the sorted list and sharing the first layer across models in the workload in which the first layer appears in the edge server. For merging, weights of a randomly selected model are used for initialization. Each time, a layer is merged, the train operation 614 trains the layer until the merged model satisfies a predetermined threshold of accuracy for each of the individual models. Additionally or alternatively, the train operation 614 ends training when a predetermined time has lapsed (e.g., a predetermined number of epochs of training). The pick-merge-train operation continues until it no longer is practical to merge any more layers without a reduction in accuracy of the merged model. Additionally or alternatively, the pick-merge-train operation ends when the cloud resources allocated to the training by the pipeline operator or an intelligent controller (e.g., the RAN intelligent controller 152 (RIC) in the cloud datacenter 150 as shown in FIG. 1).

Transmit operation 616 transmits the merged model to the edge server. In aspects, the transmit operation 616 cause the edge server to swap one or more models with the merged models. The method 600A ends with the end operation 618.

As should be appreciated, operations 602-618 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 6B is an example of a method for iteratively refreshing the models in accordance with aspects of the present disclosure. A general order of the operations for the method 600B is shown in FIG. 6B. Generally, the method 600B begins with start operation 650 and ends with end operation 660. The method 600B may include more or fewer steps or may arrange the order of the steps differently than those shown in FIG. 6B. The method 600B can be executed as a set of computer-executable instructions executed by a computer system and encoded or stored on a computer readable medium. Further, the method 600B can be performed by gates or circuits associated with a processor, an ASIC, an FPGA, a SOC or other hardware device. Hereinafter, the method 600B shall be explained with reference to the systems, components, devices, modules, software, data structures, data characteristic representations, signaling diagrams, methods, etc., described in conjunction with FIGS. 1, 2, 3, 4, 5, 6A, 7, and 8A-B.

Following start operation 650, the method 600 begins with a set of operations as indicated by "A," which corresponds to a set of operations from the transmit operation 604 to the transmit operation 616 as shown in FIG. 6A. Following the transmit operation 616 that transmits the merged model, receive operation 652 receives information associated with data drift as detected by output of the merged model.

Determine operation 654 determines whether to refresh the merged model. In aspects, the determine operation 654 determines to refresh when a degree of data drift output from one or more sub-models in the merged model exceed a predetermined threshold.

Decision operation 656 decides whether to proceed to detach operation 658 when the determine operation 654 determines the merged model should be refreshed. In aspects, the detach operation 658 splits a model exhibiting the data drift from the merged model. In some other aspects, the detach operation 658 detaches one or more consolidated layers into independent layers among sub-models of the merged model. The detach operation 658 includes retraining of both the detached models. In some other aspects, the detach operation 658 includes retraining of the merged model with the one or more consolidated layers being detached within the merged model.

When the determine operation 654 determines not to refresh the merged model, the decision operation 656 proceeds without performing the detach operation 658 to the end operation 664. The method 600B ends with the end operation 660.

As should be appreciated, operations 650-660 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the at least one processing unit 702, the program tools 706 (e.g., an application 720) may perform processes including, but not limited to, the aspects, as described herein. The application 720 includes a layer status receiver 722, a sharable layer determiner 724, a model generator 726, and a model trainer 728, as described in more detail with regard to FIG. 2. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of the communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., as an operator of servers in the on-premises edge in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., the edge servers 116 and the servers 134, and other servers as shown in FIG. 1), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world" via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for merging models in an edge server according to at least the examples provided in the sections below. As will be understood from the foregoing disclosure, one aspect of the technology relates to a computer-implemented method. The method comprises selecting, based on memory consumption, a first layer of a first model; determining, based on layer properties, a second layer of a second model matches the first layer of the first model; generating a third model, wherein the third model includes a third layer corresponding to a single instantiation of the first layer and the second layer; and transmitting the third model to an edge server, wherein the edge server executes the third model to perform data analytics on the edge server, and wherein the third model consumes less memory on the edge server than executing both the first model and the second model. The first model and the second model correspond to video analytic models. The first set and second set of properties include one or more of: input size, output size, kernel size, or stride length. The first model and the second model are distinct. The method further comprises receiving data drift information associated with a first sub-model of the third model; generating, based on the data drift information associated with the first sub-model of the third model, a fourth model, wherein the fourth model includes the first sub-model; updating the third model by detaching the first sub-model from the third model; and transmitting the third model and the fourth model. The method further comprising training the third model based on training data associated with the first model and the second model. The training the third model comprises determining that the third model meets an accuracy threshold for performing the data analytics. The first layer and the second layer are not located in corresponding locations within the first model and the second model, respectively.

Another aspect of the technology relates to a system for merging models for use in an edge server. The system comprises a processor; and a memory storing computer-executable instructions that when executed by the processor cause the system to: select, based on memory consumption, a first layer of a first model; determine, based on layer properties, a second layer of a second model matches the first layer of the first model; generate a third model, wherein the third model includes a third layer corresponding to a single instantiation of the first layer and the second layer; and transmit the third model to an edge server, wherein the edge server executes the third model to perform data analytics on the edge server, and wherein the third model consumes less memory on the edge server than executing both the first model and the second model. The first model and the second model correspond to video analytic models. The first set and second set of properties include one or more of: input size, output size, kernel size, or stride length. The computer-executable instructions when executed further cause the system to: receive data drift information associated with a first sub-model of the third model; generate, based on the data drift information associated with the first sub-model of the third model, a fourth model, wherein the fourth model includes the first sub-model; update the third model by detaching the first sub-model from the third model; and transmit the third model and the fourth model. The computer-executable instructions when executed further cause the system to: train the third model based on training data associated with the first model and the second model. The training the third model comprises determining that the third model meets an accuracy threshold for performing the data analytics. The first layer and the second layer are not located in corresponding locations within the first model and the second model, respectively.

In still further aspects, the technology relates to a computer-readable recording medium storing computer-executable instructions. The computer-executable instructions when executed by a processor cause a computer system to: select, based on memory consumption, a first layer of a first model; determine, based on layer properties, a second layer of a second model matches the first layer of the first model; generate a third model, wherein the third model includes a third layer corresponding to a single instantiation of the first layer and the second layer; and transmit the third model to an edge server, wherein the edge server executes the third model to perform data analytics on the edge server, and wherein the third model consumes less memory on the edge server than executing both the first model and the second model. The first model and the second model correspond to video analytic models. The first set and second set of properties include one or more of: input size, output size, kernel size, or stride length. The computer-executable instructions when executed further cause the system to receive data drift information associated with a first sub-model of the third model; generate, based on the data drift information associated with the first sub-model of the third model, a fourth model, wherein the fourth model includes the first sub-model; update the third model by detaching the first sub-model from the third model; and transmit the third model and the fourth model. The computer-executable instructions when executed further cause the system to train the third model based on training data associated with the first model and the second model, wherein the training the third model comprises determining that the third model meets an accuracy threshold for performing the data analytics.

Any of the one or more above aspects in combination with any other of the one or more aspect. Any of the one or more aspects as described herein.

What is claimed is:

1. A computer-implemented method for merging at least a part of a plurality of models, the method comprising:
   selecting, based on memory consumption of a first layer of a first model in a memory of an edge server, the first layer of the first model as a first sharable layer, wherein the plurality of models comprises the first model and a second model;
   determining, based on layer properties of the second model, a second layer of the second model in the memory of the edge server as a second sharable layer, wherein the second layer of the second model indicates one or more same layer properties as the first layer of the first model;
   generating a third model as a merged model of the first model and the second model, wherein the third model comprises a third layer as a common layer representing a single instantiation of both the first layer and the second layer; and
   transmitting the third model to the edge server, thereby causing the edge server to replace a respective instantiation of the first model and the second model in the memory of the edge server with the third model, and further causing the edge server to execute the third model to perform data analytics on the edge server, wherein the third model consumes less memory on the edge server than a combination of both the first model and the second model.

2. The computer-implemented method of claim 1, wherein the first model and the second model correspond to video analytic models.

3. The computer-implemented method of claim 1, wherein each of the first layer and the second layer is based on properties including one or more of:
   input size,
   output size,
   kernel size, or
   stride length.

4. The computer-implemented method of claim 1, wherein the first model and the second model are distinct.

5. The computer-implemented method of claim 1, the method further comprising:
   receiving data drift information associated with a first sub-model of the third model;
   generating, based on the data drift information associated with the first sub-model of the third model, a fourth model, wherein the fourth model includes the first sub-model;
   updating the third model by detaching the first sub-model from the third model; and
   transmitting the third model and the fourth model.

6. The computer-implemented method of claim 1, the method further comprising:
   training the third model based on training data associated with the first model and the second model.

7. The computer-implemented method of claim 6, wherein training the third model comprises determining that the third model meets an accuracy threshold for performing the data analytics.

8. The computer-implemented method of claim 1, wherein the first layer and the second layer are not located in corresponding locations within the first model and the second model, respectively.

9. A system for merging a plurality of models for use in an edge server, the system comprising:
   a processor; and
   a memory storing computer-executable instructions that when executed by the processor cause the system to:
      select, based on memory consumption of a first layer of a first model in a memory of the edge server, the first layer of the first model as a first sharable layer, wherein the plurality of models comprises the first model and a second model;
      determine, based on layer properties of the second model, a second layer of the second model in the memory of the edge server as a second sharable layer, wherein the second layer of the second model indicates one or more same layer properties as the first layer of the first model;

generate a third model as a merged model for the first model and the second model, wherein the third model comprises a third layer as a common layer representing a single instantiation of both the first layer and the second layer; and transmit the third model to the edge server, thereby causing the edge server to replace a respective instantiation of the first model and the second model in the memory of the edge server with the third model, and further causing the edge server to execute the third model to perform data analytics on the edge server, wherein the third model consumes less memory on the edge server than a combination of both the first model and the second model.

10. The system of claim 9, wherein the first model and the second model correspond to video analytic models.

11. The system of claim 9, wherein each of the first layer and the second layer is based on properties including one or more of:
input size,
output size,
kernel size, or
stride length.

12. The system of claim 9, the computer-executable instructions when executed further cause the system to:
receive data drift information associated with a first sub-model of the third model;
generate, based on the data drift information associated with the first sub-model of the third model, a fourth model, wherein the fourth model includes the first sub-model;
update the third model by detaching the first sub-model from the third model; and
transmit the third model and the fourth model.

13. The system of claim 9, the computer-executable instructions when executed further cause the system to:
train the third model based on training data associated with the first model and the second model.

14. The system of claim 13, wherein training the third model comprises determining that the third model meets an accuracy threshold for performing the data analytics.

15. The system of claim 9, wherein the first layer and the second layer are not located in corresponding locations within the first model and the second model, respectively.

16. A computer-readable recording medium storing computer-executable instructions that when executed by a processor cause a system to:
select, based on memory consumption of a first layer of a first model of a plurality of models in a memory of an edge server, the first layer of the first model as a first sharable layer, wherein the plurality of models comprises the first model and a second model;
determine, based on layer properties of the second model, a second layer of the second model in the memory of the edge server as a second sharable layer, wherein the second layer of the second model indicates one or more same layer properties as the first layer of the first model;
generate a third model as a merged model of the first model and the second model, wherein the third model comprises a third layer as a common layer representing a single instantiation of both the first layer and the second layer; and
transmit the third model to the edge server, thereby causing the edge server to replace a respective instantiation of the first model and the second model in the memory of the edge server with the third model, and further causing the edge server to execute the third model to perform data analytics on the edge server, and wherein the third model consumes less memory on the edge server than a combination of both the first model and the second model.

17. The computer-readable recording medium of claim 16, wherein the first model and the second model correspond to video analytic models.

18. The computer-readable recording medium of claim 16, wherein each of the first layer and the second layer is based on properties including one or more of:
input size,
output size,
kernel size, or
stride length.

19. The computer-readable recording medium of claim 16, the computer-executable instructions when executed further cause the system to:
receive data drift information associated with a first sub-model of the third model;
generate, based on the data drift information associated with the first sub-model of the third model, a fourth model, wherein the fourth model includes the first sub-model;
update the third model by detaching the first sub-model from the third model; and
transmit the third model and the fourth model.

20. The computer-readable recording medium of claim 16, the computer-executable instructions when executed further cause the system to:
train the third model based on training data associated with the first model and the second model, wherein training the third model comprises determining that the third model meets an accuracy threshold for performing the data analytics.

* * * * *